US012470301B2

(12) United States Patent
Xue et al.

(10) Patent No.: US 12,470,301 B2
(45) Date of Patent: Nov. 11, 2025

(54) LOCAL LIGHT BIASING FOR SILICON PHOTOMULTIPLIER-BASED OPTICAL WIRELESS COMMUNICATION

(71) Applicant: QUALCOMM Incorporated, San Diego, CA (US)

(72) Inventors: Yisheng Xue, San Diego, CA (US); Karoly Becze, Escondido, CA (US); Jing Sun, San Diego, CA (US); Xiaoxia Zhang, San Diego, CA (US); Junyi Li, Fairless Hills, PA (US); Morteza Soltani, San Diego, CA (US); Deepu Alex, San Diego, CA (US); Jason Bush, Escondido, CA (US)

(73) Assignee: Qualcomm Incorporated, San Diego, CA (US)

( * ) Notice: Subject to any disclaimer, the term of this patent is extended or adjusted under 35 U.S.C. 154(b) by 253 days.

(21) Appl. No.: 18/151,229

(22) Filed: Jan. 6, 2023

(65) Prior Publication Data

US 2024/0235691 A1 Jul. 11, 2024

(51) Int. Cl.
*H04B 10/60* (2013.01)
*H04B 10/11* (2013.01)

(52) U.S. Cl.
CPC ............. *H04B 10/60* (2013.01); *H04B 10/11* (2013.01)

(58) Field of Classification Search
CPC ................................ H04B 10/11; H04B 10/60
See application file for complete search history.

(56) References Cited

U.S. PATENT DOCUMENTS 3,885,187 A * 5/1975 Schnitzler ............... H01J 29/36 313/368
4,800,262 A * 1/1989 Lentine .................. B82Y 20/00 257/E27.128
5,451,767 A * 9/1995 Amano .................. B82Y 20/00 257/E27.128
8,350,208 B1 * 1/2013 Zhang ............... H01L 27/14647 250/226
2013/0193308 A1 * 8/2013 Cellek .................. H01L 31/109 250/208.2
2018/0031420 A1 * 2/2018 Dyba .................... G01J 3/2803
2020/0366381 A1 * 11/2020 Van Weeren ........ H04B 10/112
2020/0408989 A1 * 12/2020 Kita ...................... G02B 6/125

* cited by examiner

*Primary Examiner* — Nathan M Cors
(74) *Attorney, Agent, or Firm* — Norton Rose Fulbright US LLP

(57) ABSTRACT

This disclosure provides systems, methods, and devices for wireless communication that support local light biasing for silicon photomultiplier (SiPM)-based photodetectors used in optical wireless communication (OWC). In a first aspect, a photodetector may include a silicon photomultipier (SiPM) having an input sensor configured to detect a light signal and an output interface configured to produce an output signal proportional to an intensity of the light signal detected at the input sensor, and a controllable light source positioned to emit a biasing light signal within a field of view of the input sensor, wherein the controllable light source is configured to emit the biasing light signal within a sensitivity range of the SiPM. When such photodetector is implemented in an OWC receiver, an analysis of the output signal allows the OWC receiver to adjust the biasing light at the controllable light source. Other aspects and features are also claimed and described.

29 Claims, 6 Drawing Sheets

Light Signal 301
SiPM 302
303
304
305
306
307
308
Photodetector 300
Electrical Signal
Optical Signal

LOCAL LIGHT BIASING FOR SILICON PHOTOMULTIPLIER-BASED OPTICAL WIRELESS COMMUNICATION

TECHNICAL FIELD

Aspects of the present disclosure relate generally to optical wireless communication systems, and more particularly, to optical wireless receivers. Some features may enable and provide improved communications, including local light biasing for silicon photomultiplier (SiPM)-based photodetectors used in optical wireless communication (OWC).

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks may be multiple access networks that support communications for multiple users by sharing the available network resources. Along with radio frequency (RF), wireless communication also includes systems that use frequencies within the light spectrum, including visible light, near-infrared (IR), and IR regimes of the electromagnetic spectrum. These light spectrum communication systems may be referred to as optical wireless communication (OWC) systems.

A wireless communication network may include several components. These components may include wireless communication devices, such as a network entity, including base stations, node Bs, or the like, that may support communication for a number of user equipments (UEs). A UE may communicate with a network entity via downlink and uplink. The downlink (or forward link) refers to the communication link from the network entity to the UE, and the uplink (or reverse link) refers to the communication link from the UE to the network.

A network entity may transmit data and control information on a downlink to a UE or may receive data and control information on an uplink from the UE. On the downlink, a transmission from the network entity may encounter interference due to transmissions from neighbor network entities or from other wireless radio frequency (RF) transmitters. On the uplink, a transmission from the UE may encounter interference from uplink transmissions of other UEs communicating with the neighbor network entities or from other wireless RF transmitters. This interference may degrade performance on both the downlink and uplink.

A wireless communication network with components configured for OWC may include OWC transmitters and OWC receivers. OWC transmitters may convert information for transmission into an optical signal transmitted over an electromagnetic spectrum channel to the OWC receiver. The OWC receiver includes a photodetector that allows the OWC receiver to detect the transmitted optical signal for conversion to the information transmitted by the OWC transmitter. Within the wireless communication network, a network entity may include at least an OWC transmitter, while a UE may include at least an OWC receiver. Network entities and UEs configured for OWC may also include both an OWC transmitter and OWC receiver, in order to enable uplink and downlink optical communications at the respective device/entity.

As the demand for mobile broadband access continues to increase, the possibilities of interference and congested networks grows with more UEs accessing the long-range wireless communication networks and more short-range wireless systems being deployed in communities. Research and development continue to advance optical wireless technologies not only to meet the growing demand for wireless broadband access, but to advance and enhance the user experience with OWC.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a photodetector includes a silicon photomultipier (SiPM) including an input sensor configured to detect a light signal and an output interface configured to produce an output signal proportional to an intensity of the light signal detected at the input sensor, and a controllable light source positioned to emit a biasing light signal within a field of view of the input sensor, wherein the controllable light source is configured to emit the biasing light signal within a sensitivity range of the SiPM.

In one aspect of the disclosure, a method of wireless communication includes detecting a plurality of photons at an input sensor of a SiPM-based photodetector of the OWC receiver, wherein the plurality of photons includes zero or more input photons received from an OWC transmitter and one or more biasing photons received from a controllable light source of the OWC receiver, performing a distortion analysis or an intensity analysis of an output signal of the SiPM-based photodetector, wherein the output signal is proportional to an intensity of the plurality of photons detected, determining an intensity control signal in response to the distortion analysis or the intensity analysis, and communicating the intensity control signal to the controllable light source, wherein the intensity control signal instructs the controllable light source how adjust a bias intensity of the one or more biasing photons.

In an additional aspect of the disclosure, an OWC receiver configured for OWC including at least one processor and a memory coupled to the at least one processor. The at least one processor is configured to detect a plurality of photons at an input sensor of a SiPM-based photodetector of the OWC receiver, wherein the plurality of photons includes zero or more input photons received from an OWC transmitter and one or more biasing photons received from a controllable light source of the OWC receiver, to perform a distortion analysis or an intensity analysis of an output signal of the SiPM-based photodetector, wherein the output signal is proportional to an intensity of the plurality of photons detected, to determine an intensity control signal in response to the distortion analysis or the intensity analysis, and to communicate the intensity control signal to the controllable light source, wherein the intensity control signal instructs the controllable light source how adjust a bias intensity of the one or more biasing photons.

In an additional aspect of the disclosure, an apparatus configured for wireless communication is disclosed. The apparatus includes means for detecting a plurality of photons at an input sensor of a SiPM-based photodetector of the OWC receiver, wherein the plurality of photons includes zero or more input photons received from an OWC transmitter and one or more biasing photons received from a controllable light source of the OWC receiver, means for performing a distortion analysis or an intensity analysis of an output signal of the SiPM-based photodetector, wherein the output signal is proportional to an intensity of the plurality of photons detected, means for determining an intensity control signal in response to the distortion analysis or the intensity analysis, and means for communicating the intensity control signal to the controllable light source, wherein the intensity control signal instructs the controllable light source how adjust a bias intensity of the one or more biasing photons.

Other aspects, features, and implementations will become apparent to those of ordinary skill in the art, upon reviewing the following description of specific, exemplary aspects in conjunction with the accompanying figures. While features may be discussed relative to certain aspects and figures below, various aspects may include one or more of the advantageous features discussed herein. In other words, while one or more aspects may be discussed as having certain advantageous features, one or more of such features may also be used in accordance with the various aspects. In similar fashion, while exemplary aspects may be discussed below as device, system, or method aspects, the exemplary aspects may be implemented in various devices, systems, and methods.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Like reference numbers and designations in the various drawings indicate like elements.

DETAILED DESCRIPTION

Figure 1:
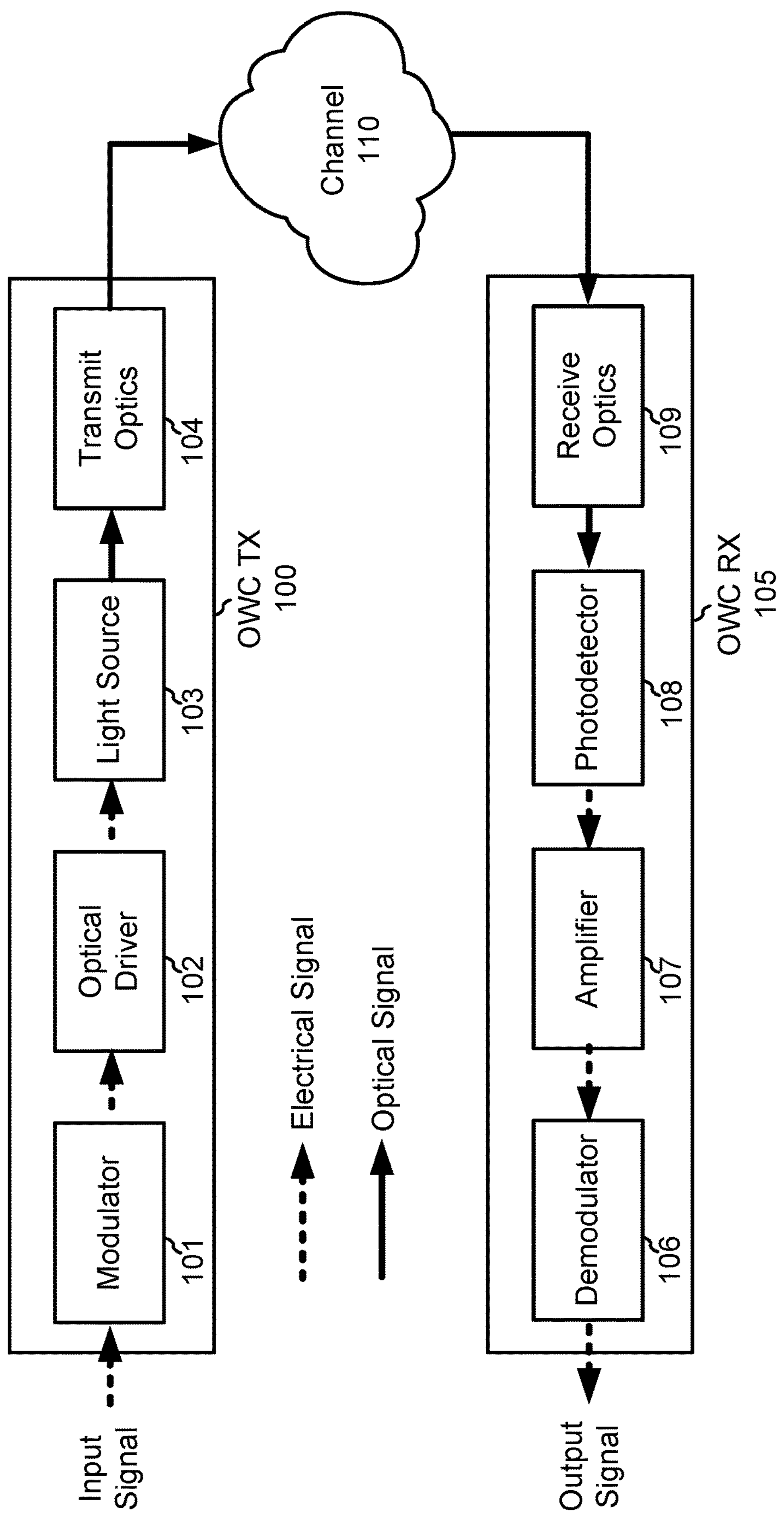
FIG. 1 is a block diagram illustrating details of an example optical wireless communication (OWC) network including an OWC transmitter in optical communication with an OWC receiver.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

The present disclosure provides systems, apparatus, methods, and computer-readable media that support local light biasing for silicon photomultiplier (SiPM)-based photodetectors used in optical wireless communication (OWC). Particular implementations of the subject matter described in this disclosure may be implemented to realize one or more of the following potential advantages or benefits. In some aspects, the present disclosure provides techniques for local light biasing for SiPM-based photodetectors used in OWC. The introduction of a local biasing light may mitigate receiver-side distortion that arises at a SiPM-based photodetector. Further, by including an automatic gain control (AGC) mechanism in which a digital signal processor (DSP) performs and analysis on the output signal from the SiPM and using the analysis to communicate an intensity control signal to the controllable light source used to provide the local light biasing. The AGC mechanism can improve the receiver performance at an OWC receiver in changing conditions.

This disclosure relates generally to optical wireless communication (OWC) systems, and more particularly, to OWC receivers and the photodetector technology used therein. Some features may enable and provide improved communications, including local light biasing for silicon photomultiplier (SiPM)-based photodetection for OWC and provide a training and adaptive control mechanism for SiPM-based photodetectors using digital signal processor (DSP) signal computations to manage the tradeoff of light intensity and receiver distortion. The optical, electromagnetic spectrum already enables global Internet access. Optical fiber communication networks not only connect all continents, they also form the backbone of modern communication networks that provide high-speed data access to cities, towns, and, increasingly, directly to the home. Extending optical communications from a physical, fiber-optic cable to the free-space medium for wireless connectivity may provide a solution for the growing demand for access and higher bandwidth requirements.

Due to the properties of light, the optical devices and components making up an OWC network may control the determination of key system parameters, such as peak data rates, link distance, and the like. Optical front-end systems have a significant impact on the realized link budget, which may be constrained by the maximum optical output power and the receiver sensitivity. The optical components of the transmitter may be configured to ensure that eye-safety standards are met, while achieving quality of service requirements. An OWC link can benefit from a larger optical transmission power, such as by driving the transmitting light source with a larger direct current (DC) bias current, but there is an upper limit in order to comply with the eye-safety standards.

At the receiver, the challenge is to capture enough photons to ensure correct detection of the transmitted information. The photodetector component of an OWC receiver performs the function of detecting or capturing photons for OWC signal reception. Silicon photomultiplier (SiPM)-based photodetectors have been observed to perform with up to 10 times better photon sensitivity than existing photodetectors (e.g., avalanche photo-diode (APD)-based photodetectors, p-i-n (PIN) diode-based photodetectors, etc.).

A SiPM is a solid-state photodetector that, in response to absorption of a photon, can produce an output signal, such as a current or voltage pulse, that reflects some level of gain. SiPM are multi-pixelated devices, in which each pixel, or microcell, includes a single photon avalanche detector (SPAD). All of the multiple SPADs making up the SiPM are connected in parallel. Each SPAD is designed to operate in the Geiger mode reverse-biased condition, just above the breakdown voltage of the avalanche diode. When a photon lands on the SPAD, it initiates a self-sustaining avalanche process and current flows until quenched. While a digital-type device, a SiPM may have either a digital or analog operation. A digital SiPM provides the digital counting of the number of photons detected and precise detection time. As a result, it produces faster and more accurate photon counts with extremely well-defined timing of the first photon detection. In contrast, an analog SiPM sums the discharge current of all SPADs on a common load resistor to form an analog output signal. The amplitude of the output signal is, therefore, proportional to the number of detected photons. Accordingly, SiPM-based photodetectors offer potentially effective photon detection for purposes of implementing OWC networks. SiPM detectors have been widely considered for light detection and ranging (LIDAR), as well as reception of on-off-keying (OOK) or pulse amplitude modulation (PAM) type waveforms for OWC.

OWC can be an essential part of $6^{th}$ Generation (6G), $7^{th}$ Generation (7G), and beyond (XG). OWC within the electromagnetic light spectrum may offer up to 1000 times the available bandwidth compared to that of RF and other sub-light frequency spectrum. Deployment of communication systems, including OWC technology, such as 5G new radio (NR) systems, 6G, 7G, XG, etc., may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a network entity (such as a Node B (NB), evolved NB (eNB), next generation NB (gNB), NR BS, 5G NB, access point (AP), a transmit receive point (TRP), or a cell, etc.) may be implemented as an aggregated network entity (also known as a standalone network entity or a monolithic network entity) or a disaggregated network entity.

FIG. 1 is a block diagram illustrating details of an example optical wireless communication (OWC) network 10 including an OWC transmitter 100 in optical communication with an OWC receiver 105. OWC transmitter 100 may include a number of component parts, including modulator 101, optical driver 102, light source 103, and transmit optics 104. OWC transmitter 100 may receive an electrical input signal. This electrical signal may be modulated at modulator 101. The modulated electrical signal would be processed at optical driver 102 in order to prepare the electrical signal to be converted to an optical signal at light source 103. The processed, modulated, electronic signal causes light source 103 to generate a light signal in a modulation and/or optical waveform. The generated light signal may then be transmitted through transmit optics 104 through channel 110 within an electromagnetic spectrum.

OWC receiver 105 may include a number of components, such as receive optics 109, photodetector 108, amplifier 107, and demodulator 106. In order to receive optical communications from OWC transmitter 100, the field of view of receive optics 109 may lie within the line of sight of the optical signal transmitted by OWC transmitter 100 via channel 110. The optical signal passes through receive optics 109 and its photons may be detected at photodetector 108. Photodetector 108 receives an optical signal input of photons and outputs an electrical signal that may be proportional to the intensity of the optical input signal received/detected. The received electrical signal may then be amplified at amplifier 107 and demodulated at demodulator 106 into a received electrical signal. OWC receiver 105 may then identify and use the communicated information from OWC transmitter 100.

An aggregated network entity may be configured to utilize a radio protocol stack that is physically or logically integrated within a single RAN node. A disaggregated network entity may be configured to utilize a protocol stack that is physically or logically distributed among two or more units (such as one or more central or centralized units (CUs), one or more distributed units (DUs), one or more radio units (RUs) or one or more optical units (OUs)). In some aspects, a CU may be implemented within a RAN node, one or more DUs, one or more OUs may be co-located with the CU, or alternatively, may be geographically or virtually distributed throughout one or multiple other RAN nodes. The DUs may be implemented to communicate with one or more RUs. Each of the CU, DU, and RU also can be implemented as virtual units, i.e., a virtual central unit (VCU), a virtual distributed unit (VDU), a virtual radio unit (VRU). Because OUs may also include optical-specific communication components, such as optical drivers, light sources, transmission optics, and the like, OUs may generally be implemented in discrete units.

Base station-type operation or network design may consider aggregation characteristics of network entity functionality. For example, disaggregated network entities may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated network entity, or disaggregated RAN architecture, can be configured for wired or wireless communication with at least one other unit.

Figure 2:
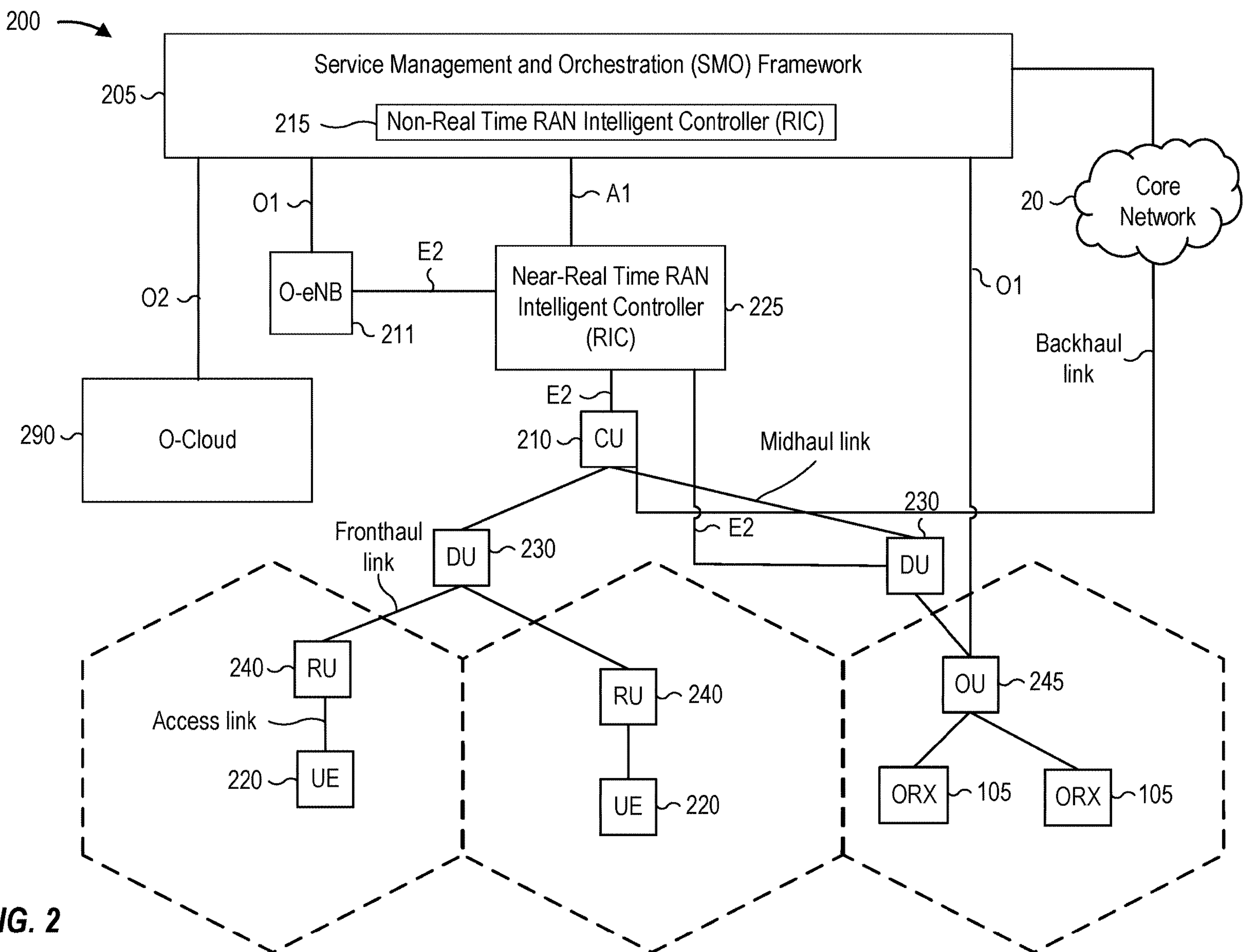
FIG. 2 is a block diagram illustrating an example disaggregated network entity architecture capable of supporting local light biasing for SiPM-based OWC.

FIG. 2 is a block diagram illustrating an example disaggregated network entity 200 architecture capable of supporting local light biasing for SiPM-based OWC. Disaggregated network entity 200 architecture may include one or more central units (CUs) 210 that can communicate directly with a core network 220 via a backhaul link, or indirectly with core network 220 through one or more disaggregated base station units (such as a Near-Real Time (Near-RT) RAN Intelligent Controller (RIC) 225 via an E2 link, or a Non-Real Time (Non-RT) RIC 215 associated with a Service Management and Orchestration (SMO) Framework 205, or both). CU 210 may communicate with one or more distributed units (DUs) 230 via respective midhaul links, such as an F1 interface. DUs 230 may communicate with one or more radio units (RUs) 240 or one or more optical units (OUs) 245 via respective fronthaul links. RUs 240 may communicate with respective UEs 220 via one or more radio frequency (RF) access links, while OU 245 may communication with respective OWC receivers (ORXs) 105 via one or more electromagnetic spectrum channels. In some implementations, UE 220 may be simultaneously served by multiple RUs 240, ORX 105 may be simultaneously served by multiple OUs 245, or, if ORX 105 also includes the RF communication capabilities of UE 220 (or vice versa), ORX 105 may be simultaneously served by an RU 240 and an OU 245.

Each of the units (CUs 210, DUs 230, RUs 240, OUs 245), as well as Near-RT RICs 225, Non-RT RICs 215 and SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units. Further, OUs 245 can include an optical interface, which may include optical drivers, light sources, and transmission optics, configured to transmit signals, or receiver optics, photodetectors, and amplifiers, configured to receive light signals, the transmitting or receiving to or from one or more of the other optical-capable units.

In some aspects, CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by CU 210. CU 210 may be configured to handle user plane functionality (i.e., Central Unit—User Plane (CU-UP)), control plane functionality (i.e., Central Unit—Control Plane (CU-CP)), or a combination thereof. In some implementations, CU 210 can be logically split into one or more CU-UP units and one or more CU-CP units. The CU-UP unit can communicate bidirectionally with the CU-CP unit via an interface, such as the E1 interface when implemented in an O-RAN configuration. CU 210 can be implemented to communicate with DU 230, as necessary, for network control and signaling.

DU 230 may correspond to a logical unit that includes one or more base station functions to control the operation of one or more RUs 240 and/or one or more OUs 245. In some aspects, DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the $3^{rd}$ Generation Partnership Project (3GPP). In some aspects, DU 230 may further host one or more low PHY layers. Each layer (or module) can be implemented with an interface configured to communicate signals with other layers (and modules) hosted by DU 230, or with the control functions hosted by CU 210.

Lower-layer functionality can be implemented by one or more RUs 240 and or one or more OUs 245. In some deployments, RU 240, controlled by DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, RU(s) 240 can be implemented to handle over the air (OTA) communication with one or more UEs 120. In some implementations, real-time and non-real-time aspects of control and user plane communication with RU(s) 240 can be controlled by a corresponding DU 230. In some scenarios, this configuration can enable DU(s) 230 and CU 210 to be implemented in a cloud-based RAN architecture, such as a vRAN architecture.

Similarly, in other deployments, OU 245, controlled by DU 230, may correspond to a logical node that hosts electromagnetic spectrum processing functions, or low-PHY layer functions (such as performing FFT, iFFT, PRACH extraction and filtering, or the like), or both, based at least in part on the functional split, such as a lower layer functional split. In such an architecture, OU(s) 245 can be implemented to handle OWC with one or more ORXs 105. In some implementations, real-time and non-real-time aspects of control and user plane communication with OU(s) 245 can similarly be controlled by a corresponding DU 230. In certain scenarios, this configuration can similarly enable implementation of DU(s) 230 and CU 210 into a cloud-based RAN architecture, such as the vRAN architecture.

SMO Framework 205 may be configured to support RAN deployment and provisioning of non-virtualized and virtualized network elements. For non-virtualized network elements, SMO Framework 205 may be configured to support the deployment of dedicated physical resources for RAN coverage requirements which may be managed via an operations and maintenance interface (such as an O1 interface). For virtualized network elements, SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUs 240 and Near-RT RICs 225. In some implementations, SMO Framework 205 can communicate with a hardware aspect of a 4G RAN, such as an open eNB (O-eNB) 211, via an O1 interface. Additionally, in some implementations, SMO Framework 205 can communicate directly with one or more RUs 240 and/or one or more OUs 245 via an O1 interface. SMO Framework 205 also may include Non-RT RIC 215 configured to support functionality of SMO Framework 205.

Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in Near-RT RIC 225. Non-RT RIC 215 may be coupled to or communicate with (such as via an A1 interface) Near-RT RIC 225. Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with Near-RT RIC 225.

In some implementations, to generate AI/ML models to be deployed in Near-RT RIC 225, Non-RT RIC 215 may receive parameters or external enrichment information from external servers. Such information may be utilized by Near-RT RIC 225 and may be received at SMO Framework 205 or Non-RT RIC 215 from non-network data sources or from network functions. In some examples, Non-RT RIC 215 or Near-RT RIC 225 may be configured to tune RAN behavior or performance. For example, Non-RT RIC 215 may monitor long-term trends and patterns for performance and employ AI/ML models to perform corrective actions through SMO Framework 205 (such as reconfiguration via O1) or via creation of RAN management policies (such as A1 policies).

As noted above, OWC within the electromagnetic light spectrum is envisioned to support the at least 1 Tbps data transmission rate per link that is suggested for 6G, 7G, and beyond (XG) radio access networks. Currently, the performance characteristics of SiPM devices offer a favorable solution for photodetector components in order to implement OWC receivers that can effectively operate within an OWC network suitable for 5G—XG communications. SiPM detectors offer range extending performance for both light detection and ranging (LIDAR) and OWC. The various aspects of the present disclosure provide for the use of local, controllable light biasing to improve the performance of a SiPM-based OWC link when the transmission DC-biasing may be adequate, due to limitations for compliance with eye-safety parameters or difficulties in driver implementation.

Laboratory research of OWC using signal waveforms, such as OFDM waveforms, have used two-tone testing, which suggest that distortion plays an enhanced role in determining the link performance. Two-tone testing typically uses simultaneous injection of two continuous wave (CW) signals of different frequencies or tones into the system. The receiver-side distortions, due to the SiPM, may be investigated using a fixed transmitter-side setup. For non-linear systems, a distortion analysis for two-tone testing can identify intermodulation signal distortions (e.g., 2 order intermodulation signals (IM2) and $3^{rd}$ order intermodulation signals (IM3)) and harmonic signal distortions (e.g., $2^{nd}$ order harmonics (HM2)). By adding a local, controllable light source, the receiver-side distortions can be mitigated by injecting local light signals to the SiPM.

Transmitter-originated distortions can be suppressed by using a larger DC bias current. However, a larger DC bias current leads to a larger modulation bandwidth, as known in optical communications. Smaller modulation bandwidth may lead to non-linearity. A larger DC bias current may further reduce or eliminate clipping that may occur under a relatively large modulation index (defined as the ratio between RMS AC current and DC current). However, the DC bias current is limited by implementation, such as to maintain compliance with eye-safety guidelines. As suggested through the laboratory research above, the SiPM introduces additional receiver-originated distortions on top of the transmitter-originated distortions. The Geiger-mode operation of SiPM when used in photodetection can lead to saturation in the absence of proper automatic gain control (AGC). The DC bias used by the transmitter to drive the light source (e.g., laser, LED, etc.) performs an implicit AGC on the SiPM with respect to the AC waveform. As suggested by the various aspects described herein, local light biasing can be exploited to perform an explicit AGC on the SiPM when the implicit AGC, provided by the DC biasing current introduced at the transmitter, is inadequate.

Figure 3:
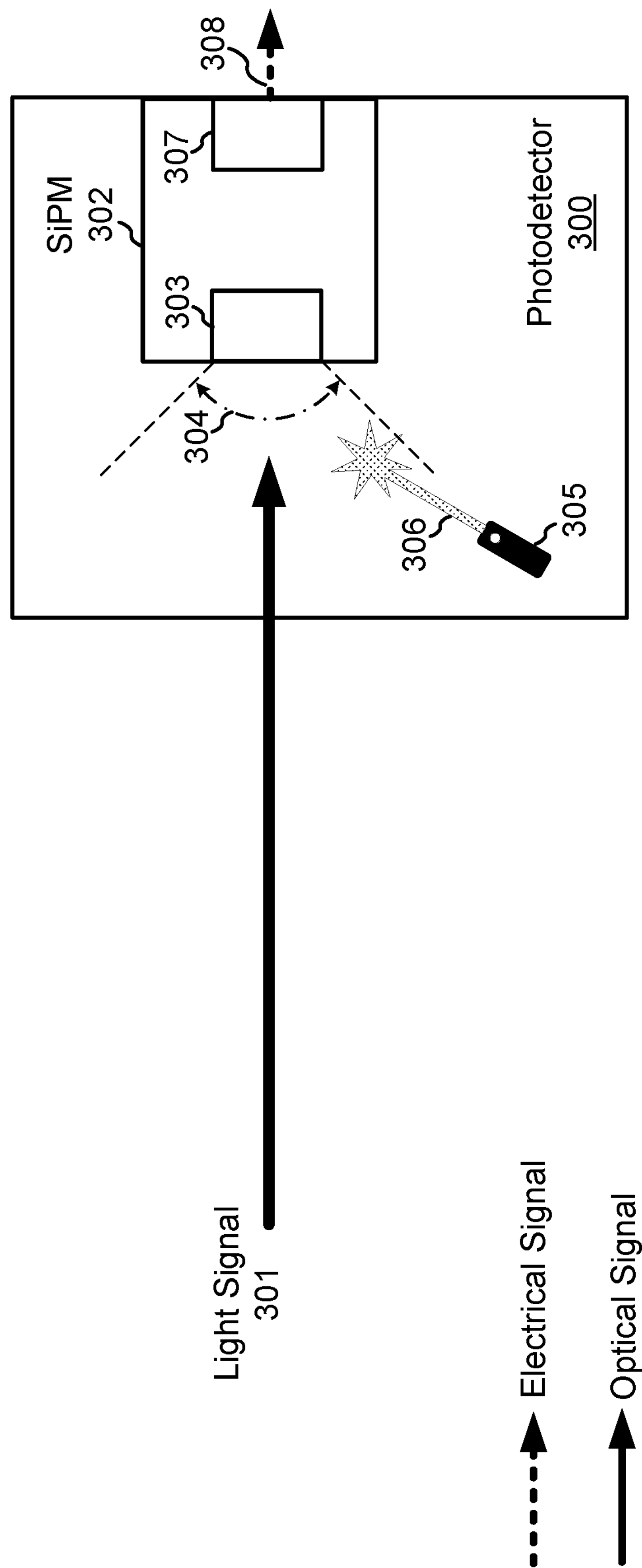
FIG. 3 is a block diagram illustrating a photodetector having a SiPM and a controllable light source configured to provide local light biasing for SiPM-based photodetectors used in OWC according to one or more aspects of the present disclosure.

FIG. 3 is a block diagram illustrating photodetector 300 having SiPM 302 and controllable light source 305 configured to provide local light biasing for SiPM-based photodetectors used in OWC according to one or more aspects of the present disclosure. Photodetector 300 includes SiPM 302, which has an input sensor 303 capable of detecting photons within a field of vision 304 and an output interface that may generate an electrical output signal, output signal 308, based on the intensity of the light signal photons detected at input sensor 303. Photodetector 300 further includes controllable light source 305, which may emit a biasing light 306 signal at a wavelength within the light sensitivity range of SiPM 302. SiPM 302 enables the light detection functionality of photodetector 300 by detecting photons of either an external signal, light signal 301, or an internal signal, biasing light 306, within field of view 304. Biasing light 306 may explicitly control gain towards the to-be-detected signal, light signal 301. Controllable light source 305 may be implemented using various types of light sources, such as an LED, laser diode, or the like.

In one configuration, controllable light source 305 may be configured to emit biasing light 306 at a constant intensity. In such configuration, the generated photodetection current can be reasonably removed as a DC offset.

It should be noted that, while the aspects described herein are directed mainly toward photodetectors and OWC receivers, the principle of the various aspects may also be applied to LIDAR operations, especially when CW signaling is used.

Figure 4:
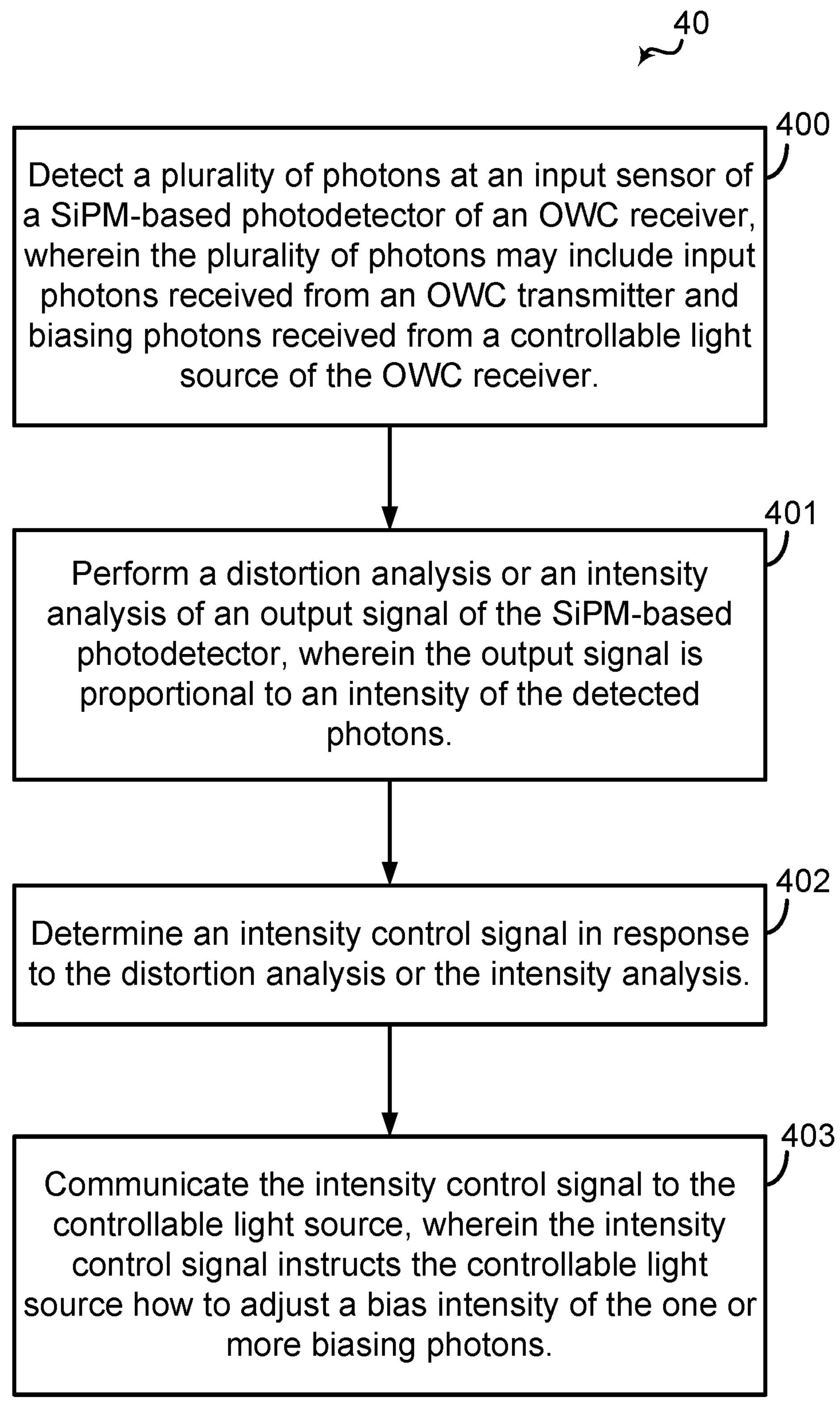
FIG. 4 is a flow diagram illustrating an example process that supports local light biasing for SiPM-based photodetectors used in OWC according to one or more aspects.

FIG. 4 is a flow diagram illustrating an example process 40 that supports local light biasing for SiPM-based photodetectors used in OWC according to one or more aspects. Operations of process 40 may be performed by an OWC receiver, such as OWC receiver 105 described above with reference to FIGS. 1, 2, or OWC receiver 105 described with reference to FIG. 5. For example, example operations (also referred to as "blocks") of process 40 may enable OWC receiver 105 to support local light biasing for SiPM-based photodetectors used in OWC.

Figure 5:
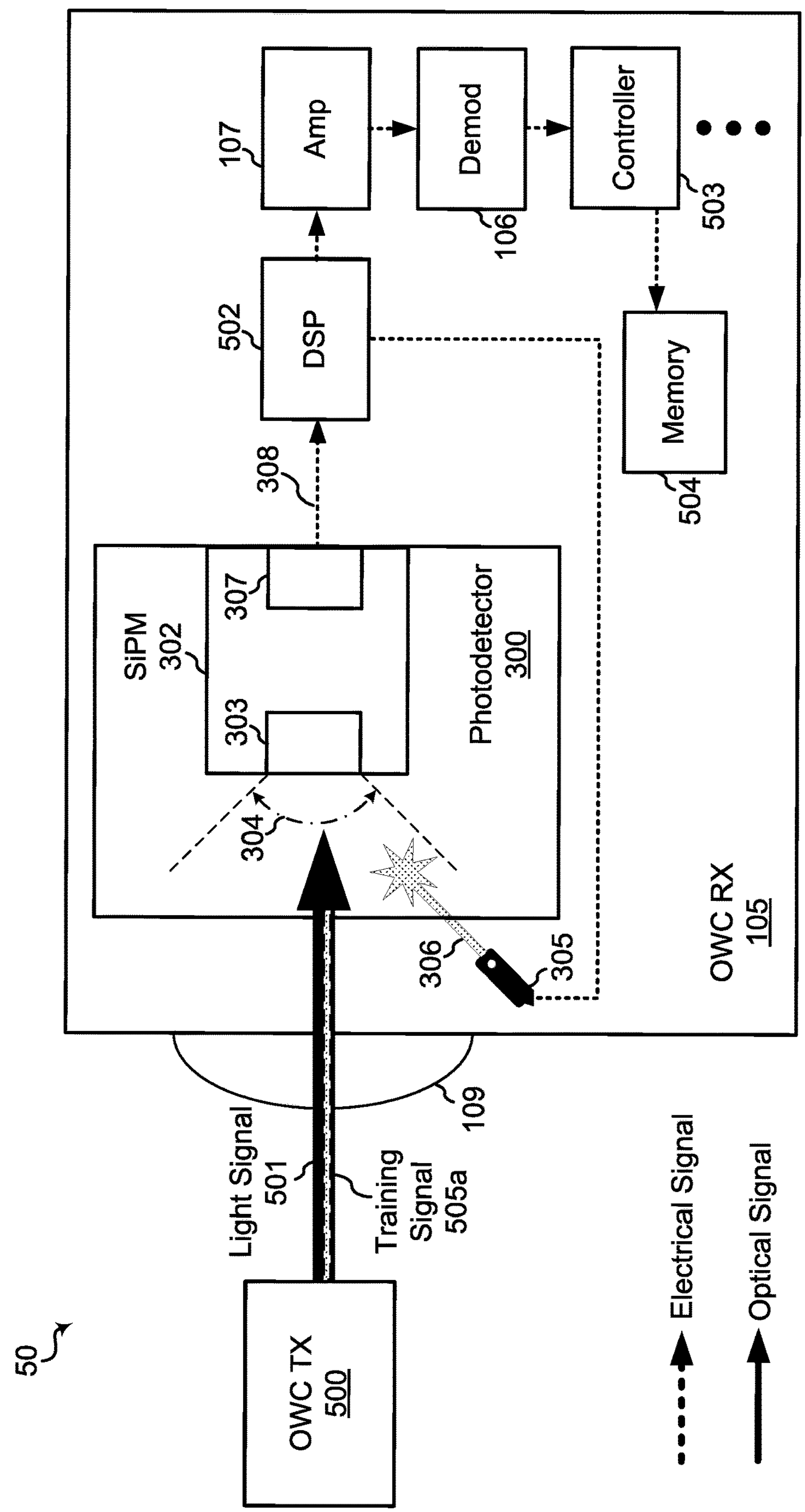
FIG. 5 is a block diagram of an example OWC receiver that supports local light biasing for SiPM-based photodetectors used in OWC according to one or more aspects.

FIG. 5 is a block diagram of an example OWC receiver 105 that supports local light biasing for SiPM-based photodetectors used in OWC according to one or more aspects. OWC receiver 105 may be configured to perform operations, including the blocks of a process described with reference to FIG. 4. In some implementations, OWC receiver 105 includes the structure, hardware, and components shown and described with reference to OWC receiver 105 of FIG. 1. OWC receiver 105 includes controller 503, which operates to execute logic or computer instructions stored in memory 504, as well as controlling the components of OWC receiver 105 that provide the features and functionality of OWC receiver 105. OWC receiver 105 further includes receive optics 109, SiPM 302-based photodetector 300, controllable light source 305, which is positioned to emit light detectable within the field of view 304 at input sensor 303 of SiPM 302. In response to any detected light photons, SiPM 302 produces an electronic output signal, output signal 308, from output interface 307 to digital signal processor (DSP) 502. DSP 502 passes on output signal 308 to amplifier 701 for demodulation by demodulator 106 and use of the demodulated information in light signal 501 by controller 503. DSP 502 may also conduct an analysis (e.g., distortion analysis, intensity analysis, etc.) on output signal 308. Results of such analysis may inform an intensity control signal from DSP 502 to controllable light source 305 that may then adjust the intensity of biasing light 306 to improve the gain of the to-be-received signal within light signal 501.

Referring back to FIG. 4, at block 400, an OWC receiver, such as OWC receiver 105, detects a plurality of photons at an input sensor of a SiPM-based photodetector of the OWC receiver, wherein the plurality of photons includes zero or more input photons received from an OWC transmitter and one or more biasing photons received from a controllable light source of the OWC receiver. OWC receiver 105, under control of controller 503, receives light photons from light signal 501 transmitted by OWC transmitter 500. The light photons from light signal 501 are received or detected via receive optics 109 and, if within field of view 304 of SiPM 302, may be detected at input sensor 303 of SiPM 302. The light photons received via receive optics 109 also includes biasing photons from biasing light emitted by controllable light source. Controllable light source 305, which is a component of OWC receiver 105 in FIG. 5, emits biasing light 306 at a frequency within the range of sensitivity of SiPM 302 and within field of view 304 to input sensor 303.

At block 401, the OWC receiver 105 performs a distortion analysis or an intensity analysis of an output signal of the SiPM-based photodetector, wherein the output signal is proportional to an intensity of the plurality of photons detected. DSP 502, under control of controller 503, receives the output signal 308 from photodetector 300 and performs an analysis on that signal. The analysis may include a distortion analysis, whether a harmonic or an inter-modulation distortion analysis, an intensity analysis, or the like.

At block 402, the OWC receiver 105 determines an intensity control signal in response to the distortion analysis or the intensity analysis. Biasing light 306 may control the gain towards the detection by SiPM 302 of light signal 501 when the DC biasing provided at OWC transmitter 500 is insufficient to overcome the total signal distortion at OWC receiver 105. DSP 502, under control of controller 503, determines how to add, adjust, or maintain the intensity of biasing light 306 based on the results of the analysis. For example, if the analysis reveals high distortion or low light intensity, DSP 502 would determine the intensity control signal to increase the intensity of biasing light 306, or if the analysis reveals low distortion or high light intensity, DSP 502 would either determine the intensity control signal to decrease the intensity of biasing light 306 or maintain its intensity.

At block 403, the OWC receiver 105 communicates the intensity control signal to the controllable light source, wherein the intensity control signal instructs the controllable light source how adjust a bias intensity of the one or more biasing photons. DSP 502, under control of controller 503, will communicate the intensity control signal to controllable light source 305. The intensity control signal includes instructions that controllable light source 305 would either increase, decrease, or maintain the intensity of biasing light 306, made up of the one or more biasing photons.

As described with reference to FIG. 4, the present disclosure provides techniques for local light biasing for SiPM-based photodetectors used in OWC. The introduction of a local biasing light may mitigate receiver-side distortion that arises at a SiPM-based photodetector. Further, by including an AGC mechanism in which a DSP performs and analysis on the output signal from the SiPM and using the analysis to communicate an intensity control signal to the controllable light source used to provide the local light biasing. The AGC mechanism can improve the receiver performance at an OWC receiver in changing conditions.

Referring back to FIG. 5, controllable light source 305 may perform an explicit AGC for OWC receiver 105. The intensity of biasing light 306, emitted as the explicit AGC by controllable light source 305, may be controlled using intensity controls signals from DSP 502, which performs an analysis on output signal 308 of SiPM 302. The analysis performed by DSP 502 may include distortion analysis, whether harmonic and/or intermodulation distortion analysis, intensity analysis, or the like. For example where the distortion analysis on output signal 308 reveals large distortion (e.g., large harmonics distortion or large inter-modulation distortion) or intensity analysis reveals low light intensity, DSP 502 would signal the intensity control signal for controllable light source 305 to increase the intensity of biasing light 306 in order to suppress the distortion or increase the light intensity. Otherwise, DSP 502 would signal the intensity control signal for controllable light source 305 to decrease the intensity of biasing light 306, where the distortion is low or the intensity analysis shows high intensity exceeding a predefined threshold. The intensity control signal may further instruct controllable light source 305 to maintain the intensity of biasing light 306 where the distortion or intensity analysis reveal no changes are necessary. Depending on the results of the analysis, DSP 502 transmits an intensity control signal for controllable light source 305 to either increase, decrease, or maintain the intensity of biasing light 306.

For example where the distortion analysis on output signal 308 reveals large distortion (e.g., large harmonics distortion or large inter-modulation distortion) or intensity analysis reveals low light intensity, DSP 502 would signal the intensity control signal for controllable light source 305 to increase the intensity of biasing light 306 in order to suppress the distortion or increase the light intensity. Otherwise, DSP 502 would signal the intensity control signal for controllable light source 305 to decrease the intensity of biasing light 306, where the distortion is low or the intensity analysis shows high intensity exceeding a predefined threshold. The intensity control signal may further instruct controllable light source 305 to maintain the intensity of biasing light 306 where the distortion or intensity analysis reveal no changes are necessary.

In one example implementation, OWC transmitter 500 may include two tones as a pilot-like signal for two-tone testing distortion analysis. In such example implementation, where DSP 502 performs a two-town testing distortion analysis on the two tones embedded within light signal 501, when large amplitude $2^{nd}$ order harmonics (HM2) or third order inter-modulation signals (IM3) are detected, DSP 502 would signal the intensity control signal that instructs controllable light source 305 to increase the intensity of biasing light 306 in order to suppress the distortion. Otherwise, DSP 502 would signal the intensity control signal to decrease the intensity of biasing light 306. It should be noted that, in practice, large or small HM2/IM3 can be evaluated by DSP 502 by comparing normalized (e.g., by fundamental signal power) HM2/IM3 values against pre-defined thresholds.

In one example implementation, DSP 502 may perform an intensity analysis on output signal 308 by measuring the received light intensity, such as after ambient light filtering. DSP 502 may then signal an on/off scheme, such that when the measured received light intensity is below a predetermined intensity, DSP 502 signals controllable light source 305 to turn on biasing light 306, whereas, when the measure received light intensity is greater than or equal to the predetermined intensity, DSP 502 signals controllable light source 305 to turn off biasing light 306.

In another example implementation, instead of an on/off scheme, the measured light intensity may be quantized and the quantized intensity level used to select an intensity control signal from a table of candidate intensity controls signals at one or both of DSP 502 and controllable light source 302. For example, where controllable light source 302 is configured to have a certain number of intensity levels (e.g., 3, 4, 8, 12, etc.), DSP 502 may use a codeword table that would signal controllable light source 302 which intensity level to set for the biasing light 306. In one example, controllable light source 302 may be configured with 8 intensity levels that may be controlled by a 3-bit digital-to-analog converter (DAC). DSP 302 may include an 8-codeword table (e.g., codeword 0-7) that it may select from according to the results of the distortion or intensity level that it analyzed. The codeword selected is included in the intensity control signal and corresponds to one of the 8 intensity levels at controllable light source 302. Thus, on receipt of the selected codeword in the intensity control signal, controllable light source 302 sets the intensity to the corresponding level for biasing light 306.

It should be noted that in certain example implementations, the measurement of receiving light intensity can be obtained via the DC current level from SiPM 302, via a DC coupling interface between SiPM 302 and DSP 502.

In an another example aspect, OWC transmitter 500 embeds a training signal 505*a* within light signal 501. DSP 502 may use the portion of output signal 308 attributable to training signal 505*a* to perform distortion analysis. In one example implementation, training signal 505*a* may include two CW signals, such as for use in a two-tone distortion analysis.

In a further example aspect, OWC transmitter 500 and OWC receiver 105 may exchange signaling that may be used for controlling the intensity of biasing light 306 emitted by controllable light source 305. In such example aspect, OWC receiver 105 reports its capability of using a local biasing signal and the range of light intensity available if OWC receiver 105 is so capable. Additionally, where the use of a local biasing signal, such as biasing light 306, has already been established, OWC receiver 105 may report the intensity of biasing light 306. In response, OWC transmitter 500 may transmit a configuration signal that includes an intensity recommendation for biasing light 306.

In an alternative implementation of the further example aspect above, OWC transmitter 500 may further send a configuration message to OWC receiver 105 that configures the details of training signal 505*a*. Thus, using the configured information regarding training signal 505*a*, OWC receiver 105 may perform the distortion analysis on the portion of output signal 308 attributable to training signal 505*a* to determine the intensity control signal for controllable light source 305.

Figure 6:
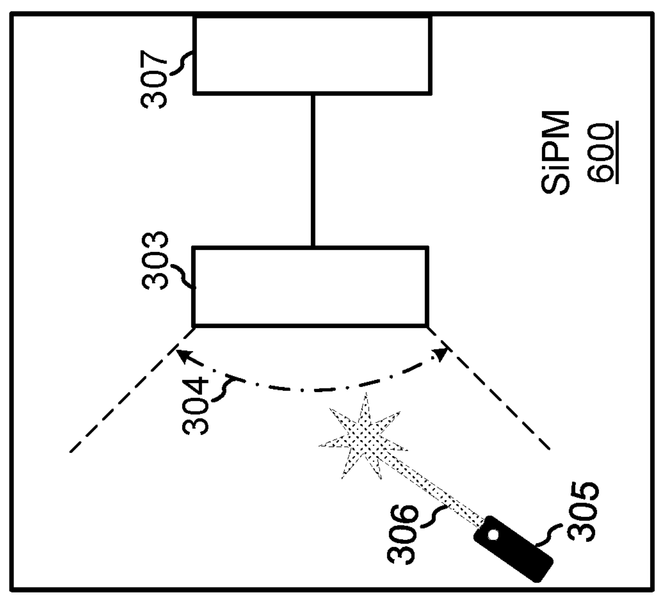
FIG. 6 is a block diagram illustrating a SiPM chip configured to provide local light biasing for SiPM-based photodetectors used in OWC according to one or more aspects.

FIG. 6 is a block diagram illustrating a SiPM chip 600 configured to provide local light biasing for SiPM-based photodetectors used in OWC according to one or more aspects. As illustrated in FIG. 3, controllable light source 305 may be configured as a component part of photodetector 300, which photodetector 300 further includes SiPM 302 as another component part. In contrast, FIG. 5 illustrates controllable light source 305 as a component part of OWC receiver 105 positioned in such a manner to provide biasing light 306 within field of view 304 of input sensor 303 of SiPM 302. FIG. 6 illustrates a further aspect, in which controllable light source 305 is integrated into the silicon substrate of SiPM chip 600. Thus, controllable light source 305 is in the same silicon chip as SiPM chip 600. In such aspect, SiPM chip 600 may introduce pin(s) to control controllable light source 305.

It is noted that one or more blocks (or operations) described with reference to FIG. 4 may be combined with one or more blocks (or operations) described with reference to another of the figures. For example, one or more blocks (or operations) of FIG. 5 may be combined with one or more blocks (or operations) of FIG. 4. As another example, one or more blocks associated with FIG. 6 may also be combined with one or more blocks associated with FIG. 4. As another example, one or more blocks associated with FIG. 4 may be combined with one or more blocks (or operations) associated with FIGS. 1-2.

In one or more aspects, techniques for supporting local light biasing for SiPM-based photodetectors used in OWC may include additional aspects, such as any single aspect or any combination of aspects described below or in connection with one or more other processes or devices described elsewhere herein. In a first of one or more aspects, supporting local light biasing for SiPM-based photodetectors used in OWC may include an OWC receiver configured to detecting a plurality of photons at an input sensor of a SiPM-based photodetector, wherein the plurality of photons includes zero or more input photons received from an OWC transmitter and one or more biasing photons received from a controllable light source of the OWC receiver, performing a distortion analysis or an intensity analysis of an output signal of the SiPM-based photodetector, wherein the output signal is proportional to an intensity of the plurality of photons detected, determining an intensity control signal in response to the distortion analysis or the intensity analysis, and communicating the intensity control signal to the controllable light source, wherein the intensity control signal instructs the controllable light source how adjust a bias intensity of the one or more biasing photons.

Additionally, the apparatus may perform or operate according to one or more aspects as described below. In some implementations, the apparatus includes a wireless device, such as a UE. In some implementations, the apparatus may include at least one processor, and a memory coupled to the processor. The processor may be configured to perform operations described herein with respect to the apparatus. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein. In some implementations, a method of wireless communication may include one or more operations described herein with reference to the apparatus.

In a second aspect, alone or in combination with the first aspect, further including a DSP electronically coupled to the output interface of the SiPM and to the controllable light source, wherein the DSP is configured to perform an analysis of the output signal of the SiPM and to adjust an intensity of the biasing light signal emitted from the controllable light source according to the analysis.

In a third aspect, alone or in combination with one or more of the first aspect or the second aspect, wherein the analysis includes a distortion analysis of the output signal using one or more of a plurality of harmonics of the output signal and a plurality of intermodulation products of the output signal.

In a fourth aspect, alone or in combination with one or more of the first aspect through the third aspect, wherein a training signal is embedded within the light signal, and wherein the distortion analysis includes the distortion analysis of the output signal corresponding to the training signal.

In a fifth aspect, alone or in combination with one or more of the first aspect through the fourth aspect, wherein the photodetector is a component part of an OWC receiver device in optical communication with an OWC transmitter, wherein the OWC receiver communicates a capability of the controllable light source, including a range of light intensity the controllable light source is capable of emitting, wherein the OWC receiver communicates an indication of an active intensity of an active biasing light signal emitted by the controllable light source, wherein the OWC receiver receives, via the photodetector, a recommended light intensity from the OWC transmitter for the biasing light signal emitted by the controllable light source, and wherein the OWC receiver receives from the OWC transmitter, via the photodetector, a configuration of the training signal embedded within the light signal.

In a sixth aspect, alone or in combination with one or more of the first aspect through the fifth aspect, wherein the analysis includes a measurement of received light intensity of the light signal detected at the input sensor of the SiPM.

In a seventh aspect, alone or in combination with one or more of the first aspect through the sixth aspect, wherein configuration of the DSP to adjust the intensity of the biasing light signal includes configuration of the DSP to: activate the controllable light source to emit the biasing light signal in response to the received light intensity of the light signal is less than a predetermined threshold input intensity, and deactivate the controllable light source in response to the received light intensity being greater than or equal to the predetermined threshold input intensity.

In an eighth aspect, alone or in combination with one or more of the first aspect through the seventh aspect, wherein configuration of the DSP to adjust the intensity of the biasing light signal includes configuration of the DSP to: select, using the received light intensity, a biasing light intensity from a table of predetermined biasing light intensities indexed according to candidate received light intensities; and adjust the intensity of the biasing light signal to the biasing light intensity selected.

In a ninth aspect, alone or in combination with one or more of the first aspect through the eighth aspect, wherein an IC chip upon which the SiPM is formed includes the controllable light source integrated into the IC chip, and wherein the IC chip includes one or more input pins accessible to control a biasing intensity of the biasing light signal emitted from the controllable light source.

A tenth aspect configured for OWC performed by an OWC receiver includes detecting a plurality of photons at an input sensor of a SiPM-based photodetector of the OWC receiver, wherein the plurality of photons includes zero or more input photons received from an OWC transmitter and one or more biasing photons received from a controllable light source of the OWC receiver; performing a distortion analysis or an intensity analysis of an output signal of the SiPM-based photodetector, wherein the output signal is proportional to an intensity of the plurality of photons detected; determining an intensity control signal in response to the distortion analysis or the intensity analysis; and communicating the intensity control signal to the controllable light source, wherein the intensity control signal instructs the controllable light source how adjust a bias intensity of the one or more biasing photons.

In an eleventh aspect, alone or in combination with the tenth aspect, wherein the performing the distortion analysis or the intensity analysis, the determining the intensity control signal, and the communicating the intensity control signal are performed by a DSP component part of the OWC receiver.

In a twelfth aspect, alone or in combination with one or more of the tenth aspect or the eleventh aspect, wherein the distortion analysis includes an analysis of one or more distortion signals of the zero or more input photons reflected in the output signal using one or more of a plurality of harmonics of the zero or more input photons reflected in the output signal and a plurality of intermodulation products of the zero or more input photons reflected in the output signal.

In a thirteenth aspect, alone or in combination with one or more of the tenth aspect through the twelfth aspect, wherein a training signal is embedded within the zero or more input photons, and wherein the distortion analysis includes the distortion analysis of the output signal corresponding to the training signal.

In a fourteenth aspect, alone or in combination with one or more of the tenth aspect through the thirteenth aspect, further including communicating a capability of the controllable light source, including a range of light intensity the controllable light source is capable of emitting, to the OWC transmitter; communicating an indication of an active intensity of an active one or more biasing photons emitted by the controllable light source to the OWC transmitter; receiving, via the SiPM-based photodetector, a recommended light intensity from the OWC transmitter for the one or more biasing photons emitted by the controllable light source; and receiving, from the OWC transmitter, via the SiPM-based photodetector, a configuration of the training signal embedded within the zero or more input photons.

In a fifteenth aspect, alone or in combination with one or more of the tenth aspect through the fourteenth aspect, wherein the intensity control signal includes one of: an activation signal instructing the controllable light source to emit the one or more biasing photons in response to the intensity analysis reflecting a received light intensity of the plurality of photons being less than a predetermined threshold input intensity, and a deactivation signal instructing the controllable light source to cease emission of the one or more biasing photons in response to the intensity analysis reflecting the received light intensity of the plurality of photons being greater than or equal to the predetermined threshold input intensity.

In a sixteenth aspect, alone or in combination with one or more of the tenth aspect through the fifteenth aspect, wherein the determining the intensity control signal includes: selecting a biasing light intensity from a table of predetermined biasing light intensities indexed according to a result of the distortion analysis or the intensity analysis.

A seventeenth aspect includes an OWC receiver configured for OWC, the OWC receiver includes at least one processor; and a memory coupled to the at least one processor, wherein the at least one processor is configured: to detect a plurality of photons at an input sensor of a SiPM-based photodetector of the OWC receiver, wherein the plurality of photons includes zero or more input photons received from an OWC transmitter and one or more biasing photons received from a controllable light source of the OWC receiver; to perform a distortion analysis or an intensity analysis of an output signal of the SiPM-based photodetector, wherein the output signal is proportional to an intensity of the plurality of photons detected; to determine an intensity control signal in response to the distortion analysis or the intensity analysis; and to communicate the intensity control signal to the controllable light source, wherein the intensity control signal instructs the controllable light source how adjust a bias intensity of the one or more biasing photons.

In an eighteenth aspect, alone or in combination with the seventeenth aspect, wherein the configuration of the at least one process to perform the distortion analysis or the intensity analysis, to determine the intensity control signal, and to communicate the intensity control signal are performed by a DSP component part of the OWC receiver.

In a nineteenth aspect, alone or in combination with one or more of the seventeenth aspect or the eighteenth aspect, wherein the distortion analysis includes an analysis of one or more distortion signals of the zero or more input photons reflected in the output signal using one or more of a plurality of harmonics of the zero or more input photons reflected in the output signal and a plurality of intermodulation products of the zero or more input photons reflected in the output signal.

In a twentieth aspect, alone or in combination with one or more of the seventeenth aspect through the nineteenth aspect, wherein a training signal is embedded within the zero or more input photons, and wherein the distortion analysis includes the distortion analysis of the output signal corresponding to the training signal.

In a twenty-first aspect, alone or in combination with one or more of the seventeenth aspect through the twentieth aspect, further including configuration of the at least one processor: to communicate a capability of the controllable light source, including a range of light intensity the controllable light source is capable of emitting, to the OWC transmitter; to communicate an indication of an active intensity of an active one or more biasing photons emitted by the controllable light source to the OWC transmitter; to receive, via the SiPM-based photodetector, a recommended light intensity from the OWC transmitter for the one or more biasing photons emitted by the controllable light source; and to receive, from the OWC transmitter, via the SiPM-based photodetector, a configuration of the training signal embedded within the zero or more input photons.

In a twenty-second aspect, alone or in combination with one or more of the seventeenth aspect through the twenty-first aspect, wherein the intensity control signal includes one of: an activation signal instructing the controllable light source to emit the one or more biasing photons in response to the intensity analysis reflecting a received light intensity of the plurality of photons being less than a predetermined threshold input intensity, and a deactivation signal instructing the controllable light source to cease emission of the one or more biasing photons in response to the intensity analysis reflecting the received light intensity of the plurality of photons being greater than or equal to the predetermined threshold input intensity.

In a twenty-third aspect, alone or in combination with one or more of the seventeenth aspect through the twenty-second aspect, wherein the configuration of the at least one processor to determine the intensity control signal includes configuration of the at least one processor to select a biasing light intensity from a table of predetermined biasing light intensities indexed according to a result of the distortion analysis or the intensity analysis.

A twenty-fourth aspect includes an OWC receiver configured for wireless communication, including: means for detecting a plurality of photons at an input sensor of a SiPM-based photodetector of the OWC receiver, wherein the plurality of photons includes zero or more input photons received from an OWC transmitter and one or more biasing photons received from a controllable light source of the OWC receiver; means for performing a distortion analysis or an intensity analysis of an output signal of the SiPM-based photodetector, wherein the output signal is proportional to an intensity of the plurality of photons detected; means for determining an intensity control signal in response to the distortion analysis or the intensity analysis; and means for communicating the intensity control signal to the controllable light source, wherein the intensity control signal instructs the controllable light source how adjust a bias intensity of the one or more biasing photons.

In a twenty-fifth aspect, alone or in combination with the twenty-fourth aspect, wherein the means for performing the distortion analysis or the intensity analysis, the means for determining the intensity control signal, and the means for communicating the intensity control signal are performed by a DSP component part of the OWC receiver.

In a twenty-sixth aspect, alone or in combination with one or more of the twenty-fourth aspect or the twenty-fifth aspect, wherein the distortion analysis includes an analysis of one or more distortion signals of the zero or more input photons reflected in the output signal using one or more of a plurality of harmonics of the zero or more input photons reflected in the output signal and a plurality of intermodulation products of the zero or more input photons reflected in the output signal.

In a twenty-seventh aspect, alone or in combination with one or more of the twenty-fourth aspect through the twenty-sixth, wherein a training signal is embedded within the zero or more input photons, and wherein the distortion analysis includes the distortion analysis of the output signal corresponding to the training signal.

In a twenty-eighth aspect, alone or in combination with one or more of the twenty-fourth aspect through the twenty-seventh aspect, further including: means for communicating a capability of the controllable light source, including a range of light intensity the controllable light source is capable of emitting, to the OWC transmitter; means for communicating an indication of an active intensity of an active one or more biasing photons emitted by the controllable light source to the OWC transmitter; means for receiving, via the SiPM-based photodetector, a recommended light intensity from the OWC transmitter for the one or more biasing photons emitted by the controllable light source; and means for receiving, from the OWC transmitter, via the SiPM-based photodetector, a configuration of the training signal embedded within the zero or more input photons.

In a twenty-ninth aspect, alone or in combination with one or more of the twenty-fourth aspect through the twenty-eighth aspect, wherein the intensity control signal includes one of: an activation signal instructing the controllable light source to emit the one or more biasing photons in response to the intensity analysis reflecting a received light intensity of the plurality of photons being less than a predetermined threshold input intensity, and a deactivation signal instructing the controllable light source to cease emission of the one or more biasing photons in response to the intensity analysis reflecting the received light intensity of the plurality of photons being greater than or equal to the predetermined threshold input intensity.

In a thirtieth aspect, alone or in combination with one or more of the twenty-fourth aspect through the twenty-ninth aspect, wherein the means for determining the intensity control signal includes: means for selecting a biasing light intensity from a table of predetermined biasing light intensities indexed according to a result of the distortion analysis or the intensity analysis.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-6 include processors, electronic/optical devices, hardware devices, electronic/optical components, logical circuits, memories, software codes, firmware codes, among other examples, or any combination thereof. Software shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A photodetector comprising:

a silicon photomultipier (SiPM) including an input sensor configured to detect a light signal and an output interface configured to produce an output signal proportional to an intensity of the light signal detected at the input sensor;

a controllable light source positioned to emit a biasing light signal within a field of view of the input sensor, wherein the controllable light source is configured to emit the biasing light signal within a sensitivity range of the SiPM; and processing circuitry electronically coupled to the output interface of the SiPM and to the controllable light source, wherein the processing circuitry is configured to adjust an intensity of the biasing light signal emitted from the controllable light source in accordance with an analysis of the output signal.

2. The photodetector of claim 1, wherein the analysis includes a distortion analysis of the output signal using one or more of a plurality of harmonics of the output signal and a plurality of intermodulation products of the output signal.

3. The photodetector of claim 2, wherein a training signal is embedded within the light signal, and wherein the distortion analysis includes the distortion analysis of the output signal corresponding to the training signal.

4. The photodetector of claim 3, wherein the photodetector is a component part of an optical wireless communication (OWC) receiver device in optical communication with an OWC transmitter, wherein the OWC receiver communicates a capability of the controllable light source, including a range of light intensity the controllable light source is capable of emitting, wherein the OWC receiver communicates an indication of an active intensity of an active biasing light signal emitted by the controllable light source, wherein the OWC receiver receives, via the photodetector, a recommended light intensity from the OWC transmitter for the biasing light signal emitted by the controllable light source, and wherein the OWC receiver receives from the OWC transmitter, via the photodetector, a configuration of the training signal embedded within the light signal.

5. The photodetector of claim 1, wherein the analysis includes a measurement of received light intensity of the light signal detected at the input sensor of the SiPM.

6. The photodetector of claim 5, wherein configuration of the DSP to adjust the intensity of the biasing light signal includes configuration of the DSP to:

activate the controllable light source to emit the biasing light signal in response to the received light intensity of the light signal is less than a predetermined threshold input intensity, and deactivate the controllable light source in response to the received light intensity being greater than or equal to the predetermined threshold input intensity.

7. The photodetector of claim 5, wherein configuration of the DSP to adjust the intensity of the biasing light signal includes configuration of the DSP to:

select, using the received light intensity, a biasing light intensity from a table of predetermined biasing light intensities indexed according to candidate received light intensities; and adjust the intensity of the biasing light signal to the biasing light intensity selected.

8. The photodetector of claim 1, wherein an integrated circuit (IC) chip upon which the SiPM is formed includes the controllable light source integrated into the IC chip, and wherein the IC chip includes one or more input pins accessible to control a biasing intensity of the biasing light signal emitted from the controllable light source.

9. A method of optical wireless communication (OWC) performed by an OWC receiver, the method comprising:

detecting a plurality of photons at an input sensor of a silicon photomultiplier (SiPM)-based photodetector of the OWC receiver, wherein the plurality of photos includes one or more input photons received from an OWC transmitter and one or more biasing photons received from a controllable light source of the OWC receiver;

performing a distortion analysis or an intensity analysis of an output signal of the SiPM-based photodetector, wherein the output signal is proportional to an intensity of the plurality of photons detected;

determining an intensity control signal in response to the distortion analysis or the intensity analysis; and communicating the intensity control signal to the controllable light source, wherein the intensity control signal instructs the controllable light source how to adjust a bias intensity of the one or more biasing photons.

10. The method of claim 9, wherein the performing the distortion analysis or the intensity analysis, the determining the intensity control signal, and the communicating the intensity control signal are performed by a digital signal processor (DSP) component part of the OWC receiver.

11. The method of claim 10, wherein, when the one or more input photons include two or more input photons, the distortion analysis includes an analysis of one or more distortion signals of the two or more input photons reflected in the output signal using one or more of a plurality of harmonics of the two or more input photons reflected in the output signal and a plurality of intermodulation products of the two or more input photons reflected in the output signal.

12. The method of claim 11, wherein a training signal is embedded within the two or more input photons, and wherein the distortion analysis includes the distortion analysis of the output signal corresponding to the training signal.

13. The method of claim 12, further including:

communicating a capability of the controllable light source, including a range of light intensity the controllable light source is capable of emitting, to the OWC transmitter;

communicating an indication of an active intensity of an active one or more biasing photons emitted by the controllable light source to the OWC transmitter;

receiving, via the SiPM-based photodetector, a recommended light intensity from the OWC transmitter for the one or more biasing photons emitted by the controllable light source; and receiving, from the OWC transmitter, via the SiPM-based photodetector, a configuration of the training signal embedded within the two or more input photons.

14. The method of claim 9, wherein the intensity control signal includes one of:

an activation signal instructing the controllable light source to emit the one or more biasing photons in response to the intensity analysis reflecting a received light intensity of the plurality of photons being less than a predetermined threshold input intensity, and a deactivation signal instructing the controllable light source to cease emission of the one or more biasing photons in response to the intensity analysis reflecting the received light intensity of the plurality of photons being greater than or equal to the predetermined threshold input intensity.

15. The method of claim 9, wherein the determining the intensity control signal includes:

selecting a biasing light intensity from a table of predetermined biasing light intensities indexed according to a result of the distortion analysis or the intensity analysis.

16. An optical wireless communication (OWC) receiver configured for OWC, the OWC receiver comprising:

at least one processor; and a memory coupled to the at least one processor, wherein the at least one processor is configured:

to detect a plurality of photons at an input sensor of a silicon photomultiplier (SiPM)-based photodetector of the OWC receiver, wherein the plurality of photons includes one or more input photons received from an OWC transmitter and one or more biasing photons received from a controllable light source of the OWC receiver;

to perform a distortion analysis or an intensity analysis of an output signal of the SiPM-based photodetector, wherein the output signal is proportional to an intensity of the plurality of photons detected;

to determine an intensity control signal in response to the distortion analysis or the intensity analysis; and to communicate the intensity control signal to the controllable light source, wherein the intensity control signal instructs the controllable light source how to adjust a bias intensity of the one or more biasing photons.

17. The OWC receiver of claim 16, wherein the configuration of the at least one process to perform the distortion analysis or the intensity analysis, to determine the intensity control signal, and to communicate the intensity control signal are performed by a digital signal processor (DSP) component part of the OWC receiver.

18. The OWC receiver of claim 17, wherein, when the one or more input photons include two or more input photons, the distortion analysis includes an analysis of one or more distortion signals of the two or more input photons reflected in the output signal using one or more of a plurality of harmonics of the two or more input photons reflected in the output signal and a plurality of intermodulation products of the two or more input photons reflected in the output signal.

19. The OWC receiver of claim 18, wherein a training signal is embedded within the two or more input photons, and wherein the distortion analysis includes the distortion analysis of the output signal corresponding to the training signal.

20. The OWC receiver of claim 19, further including configuration of the at least one processor:

to communicate a capability of the controllable light source, including a range of light intensity the controllable light source is capable of emitting, to the OWC transmitter;

to communicate an indication of an active intensity of an active one or more biasing photons emitted by the controllable light source to the OWC transmitter;

to receive, via the SiPM-based photodetector, a recommended light intensity from the OWC transmitter for the one or more biasing photons emitted by the controllable light source; and to receive, from the OWC transmitter, via the SiPM-based photodetector, a configuration of the training signal embedded within the two or more input photons.

21. The OWC receiver of claim 16, wherein the intensity control signal includes one of:

an activation signal instructing the controllable light source to emit the one or more biasing photons in response to the intensity analysis reflecting a received light intensity of the plurality of photons being less than a predetermined threshold input intensity, and a deactivation signal instructing the controllable light source to cease emission of the one or more biasing photons in response to the intensity analysis reflecting the received light intensity of the plurality of photons being greater than or equal to the predetermined threshold input intensity.

22. The OWC receiver of claim 16, wherein the configuration of the at least one processor to determine the intensity control signal includes configuration of the at least one processor to select a biasing light intensity from a table of predetermined biasing light intensities indexed according to a result of the distortion analysis or the intensity analysis.

23. An optical wireless communication (OWC) receiver configured for wireless communication, comprising:

means for detecting a plurality of photons at an input sensor of a silicon photomultiplier (SiPM)-based photodetector of the OWC receiver, wherein the plurality of photons includes one or more input photons received from an OWC transmitter and one or more biasing photons received from a controllable light source of the OWC receiver;

means for performing a distortion analysis or an intensity analysis of an output signal of the SiPM-based photodetector, wherein the output signal is proportional to an intensity of the plurality of photons detected;

means for determining an intensity control signal in response to the distortion analysis or the intensity analysis; and means for communicating the intensity control signal to the controllable light source, wherein the intensity control signal instructs the controllable light source how to adjust a bias intensity of the one or more biasing photons.

24. The OWC receiver of claim 23, wherein the means for performing the distortion analysis or the intensity analysis, the means for determining the intensity control signal, and the means for communicating the intensity control signal are performed by a digital signal processor (DSP) component part of the OWC receiver.

25. The OWC receiver of claim 24, wherein, when the one or more input photons include two or more input photons, the distortion analysis includes an analysis of one or more distortion signals of the two or more input photons reflected in the output signal using one or more of a plurality of harmonics of the two or more input photons reflected in the output signal and a plurality of intermodulation products of the two or more input photons reflected in the output signal.

26. The OWC receiver of claim 25, wherein a training signal is embedded within the two or more input photons, and wherein the distortion analysis includes the distortion analysis of the output signal corresponding to the training signal.

27. The OWC receiver of claim 26, further including:

means for communicating a capability of the controllable light source, including a range of light intensity the controllable light source is capable of emitting, to the OWC transmitter;

means for communicating an indication of an active intensity of an active one or more biasing photons emitted by the controllable light source to the OWC transmitter;

means for receiving, via the SiPM-based photodetector, a recommended light intensity from the OWC transmitter for the one or more biasing photons emitted by the controllable light source; and means for receiving, from the OWC transmitter, via the SiPM-based photodetector, a configuration of the training signal embedded within the two or more input photons.

28. The OWC receiver of claim 23, wherein the intensity control signal includes one of:

an activation signal instructing the controllable light source to emit the one or more biasing photons in response to the intensity analysis reflecting a received light intensity of the plurality of photons being less than a predetermined threshold input intensity, and a deactivation signal instructing the controllable light source to cease emission of the one or more biasing photons in response to the intensity analysis reflecting the received light intensity of the plurality of photons being greater than or equal to the predetermined threshold input intensity.

29. The OWC receiver of claim 23, wherein the means for determining the intensity control signal includes:

means for selecting a biasing light intensity from a table of predetermined biasing light intensities indexed according to a result of the distortion analysis or the intensity analysis.

* * * * *